Patented Apr. 18, 1933

1,904,235

UNITED STATES PATENT OFFICE

VALENTIN HOTTENROTH, OF MANNHEIM, AND OTTO FAUST, OF MANNHEIM-NEU-OSTHEIM, GERMANY, ASSIGNORS TO ZELLSTOFFFABRIK WALDHOF, OF MANNHEIM-WALDHOF, GERMANY

METHOD OF IMPROVING CELLULOSE RAW MATERIAL OF ALL KINDS

No Drawing. Application filed November 12, 1928, Serial No. 319,001, and in Germany November 24, 1927.

The cellulose raw material used in the chemical industry consists chiefly of cotton and ligno-cellulose, together with small quantities of materials made of jute, esparto grass, straw and the like. The usefulness of these substances varies considerably according to the purpose concerned. They all possess a comparatively small capacity of reaction, although naturally substantial differences may exist in this respect according to the nature and refinement of the material. Attempts have been made to increase both the purity and reactivity of the cellulose materials by treating with alkalies, use having also been made of concentrated alkali liquors, thus mercerizing the cellulose, and considerable improvement has also often been obtained by such treatment with alkalies. Nevertheless there is still a certain slowness to react in the case of materials treated with dilute alkalies and also in the case of the mercerized materials. This characteristic is least more especially as far as cotton is concerned and although in its case too it constitutes a disadvantage, the cotton can be used. In the case of the other cellulose materials however, more particularly ligno-cellulose, even after the usual treatment with alkalies, the reactivity is still so slight that the materials hardly react at all with many reagents or only to a very incomplete extent, which naturally prevents their being employed for many purposes.

It has been found that a cellulose material having a very pronounced capacity of reaction is obtained if the cellulose which has been saturated with caustic alkali is subjected to a ripening process, such as is generally carried out in a similar way, but for very different reasons, in the viscose process, and if necessary after a pre-determined period of ripening, adapted to suit the purpose of use, the caustic alkali is removed from the material by washing out. In this way not only does one obtain a cellulose material of maximum reactivity, which is strikingly suitable for all chemical purposes, but it is also possible by prolonging or shortening the period of ripening or varying the ripening temperature or by the simultaneous employment of both measures, to graduate the reaction capacity and the degree of disintegration of the cellulose as desired and at the same time correspondingly influence the properties of the compounds to be prepared from the material.

It has also been found that it is not necessary with the method referred to, to employ liquors having the concentration usual for mercerizing, containing about 18 percent by weight of caustic soda. On the contrary, according to this invention lye containing 9–12% of caustic alkali is used.

It is possible in this way to improve bleached and unbleached cellulose material, although naturally bleached material results in somewhat purer products when further used.

Example 100 kgs. air-dried, bleached sulphite cellulose are immersed in 300 litres of a 12% soda lye for 2 hours, and then pressed off to about three times the original weight. The liquor from pressing is recovered. The expressed residue is separated into fibres in the usual manner, whereupon it is stored in sheet metal drums for 5 days at 25° C. After this time the mass (while recovering the caustic alkali contained therein) is washed, acidified and neutralized. The material is then placed in a known manner into pasteboard or paper moulds and dried, or, when possible, also used directly in the moist state.

What we claim is:

1. The process for improving bleached sulphite cellulose consisting in immersing 100 kgs. of the air-dried sulphite cellulose in 300 litres of 12% soda lye for 2 hours, in pressing off until the material weighs about 300 kgs., in separating the material into fibres and ripening for 5 days at 25° C., and in washing, acidifying and neutralizing the material, as set forth.

2. The process for improving bleached sulphite cellulose consisting in immersing air-dried sulphite cellulose in soda lye of at least 12% for about two hours, in pressing off until the material weighs about three times the quantity of the original cellulose, in separating the material into fibres, in ripening for several days at about 20-25° C., and in washing, acidifying, and neutralizing the material as set forth.

In testimony whereof we have signed our names to this specification.

VALENTIN HOTTENROTH.
OTTO FAUST.